G. DALÉN.
APPARATUS FOR AUTOMATICALLY OPENING AND CLOSING GAS CONDUITS.
APPLICATION FILED MAY 21, 1918.
1,342,160. Patented June 1, 1920.
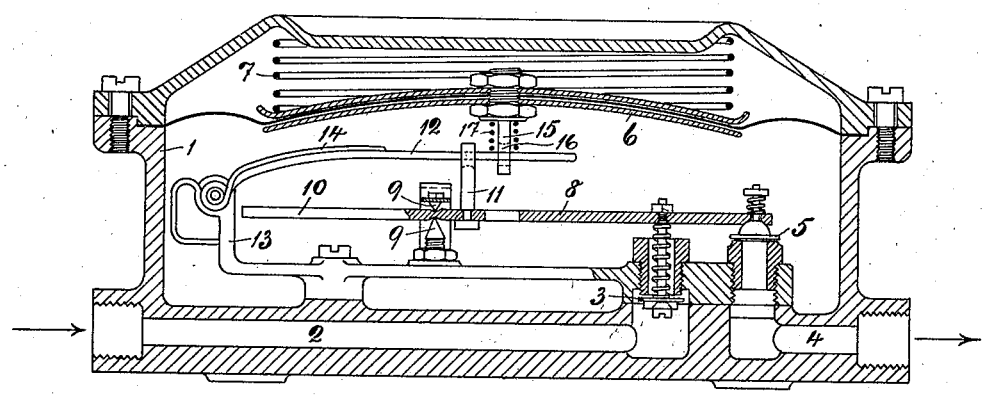
Inventor.
G. Dalén.
By H. R. Kerslake
Atty.

UNITED STATES PATENT OFFICE.

GUSTAF DALÉN, OF LIDINGÖN, STOCKHOLM, SWEDEN.

APPARATUS FOR AUTOMATICALLY OPENING AND CLOSING GAS-CONDUITS.

1,342,160.	Specification of Letters Patent.	Patented June 1, 1920.

Application filed May 21, 1918. Serial No. 235,910.

*To all whom it may concern:*

Be it known that I, GUSTAF DALÉN, engineer, residing at Skärsätra, Lidingön, Stockholm, Sweden, have invented certain new and useful Improvements in Apparatus for Automatically Opening and Closing Gas-Conduits, of which the following is a specification.

The present invention refers to apparatus for automatically opening and closing a gas conduit at certain intervals of time, comprising a casing, closed by a spring actuated diaphragm, which controls the opening and closing of a valve, inserted in an inlet conduit to the diaphragm casing and a valve, inserted in an outlet conduit from said casing. According to the invention said valves are arranged in such a manner, that the pressure of the gas, flowing through the valves in their open position, tends to close said valves, which open against the action of said pressure.

The accompanying drawing shows a section of an apparatus, provided with the present invention.

1 indicates a diaphragm casing, connected with a gas inlet conduit 2, provided with a valve 3, and with a gas outlet conduit 4, provided with a valve 5. The diaphragm casing 1 is closed by a diaphragm 6, loaded by a spring 7. The valves 3 and 5 are arranged so as to open in opposite directions, and are secured to a plate 8 or the like, rocking on edges 9, and balanced by means of a projection 10, extending on the opposite side of said edges. The plate 8 is connected to the diaphragm 6 by means of a bar 11, through the upper part of which extends an arm 12, rocking on a stud 13 and actuated by a spring 14. The arm 12 extends with a certain play through a slot 16 in a bar 15 fixed to the diaphragm 6.

The device works in the following manner:

In the position of the parts shown on the drawing gas flows through the open inlet valve 3 into the diaphragm casing 1 and causes the diaphragm 6 to move upward. The diaphragm tends to move the plate 8 upward and thereby to close the valve 3 and to open the valve 5, as soon as the lower edge of the slot 16 abuts the arm 12. The valve 5 however is kept closed by the gas pressure, prevailing in the diaphragm casing 1, until the pressure on the upper side of the valve 5 is overcome by the gas pressure on the diaphragm. When this occurs and the valve 5 begins to open, the valve 5 will be subject to pressure even on its under side, whereby it will be fully opened. Simultaneously the valve 3 begins to close, whereby the gas flowing through the valve will be throttled, so that a difference of the pressures on the upper and the under side of the valve will be established, and the gas pressure in the inlet 2 will help to close the valve. The plate 8 thus will change its position, so that the valve 5 will be opened and the valve 3 be closed. In order to secure the movement of the plate and prevent its liability to take an intermediate position, a spring may be inserted in the connection between the diaphragm 6 and the plate 8, such as the spring 17, which is shown inserted between the diaphragm 6 and the bar 12. As soon as the valve 5 begins to open and the abutment between the bar 12 and lower edge of the slot ceases, the spring 17, which has been stretched during the upward motion of the diaphragm 6, pulls the bar 12, so that the plate 8 surely will carry out the required motion.

By suitably dimensioning the diaphragm or the size of the casing 1, the spring 17 may be omitted, the elasticity of the diaphragm or the expansion of the gas in the casing 1, taking place when opening the valve 5, being sufficient for preventing the plate 8 from remaining in an intermediate position. Any of the connection members between the diaphragm and the plate, such as the bar 12, may also be made flexible, or the plate 8 itself. The inlet valve 3 is kept closed during the exhaust period by the pressure in the gas inlet conduit 2, which is higher than the pressure in the diaphragm casing 1.

During the exhaust period of the gas from the casing 1 the diaphragm 6 moves downward until the upper edge of the slot 16 abuts the bar 12. The diaphragm spring 7 now tends to move the plate 8 downward and to close the valve 5, thereby opening the valve 3, which, however, is kept closed until the pressure of the inlet gas is overcome by the pressure of the spring 7. As soon as this occurs, the valve 3 begins to open, whereby an augmented pressure is created on the upper side, whereas simultaneously owing to the throttling of the valve 5 a difference of pressure is established between the pressures of gas on its two sides. The inlet valve 3 will now be opened completely, and the outlet valve 5 be closed simultaneously. The spring 17 hereby has a similar function as above described and prevents the plate 8 from maintaining an intermediate position.

In the construction shown the diaphragm actuates the valves 3 and 5 with the aid of a long lever, whereby a rapid motion of the valves at a slight motion of the diaphragm is insured. For this purpose the place of connection between the bar 11 and the plate 8 is situated comparatively near to the rocking point of the valve 8 on the edges 9.

Having now particularly described my invention and set forth the manner, in which it is to be carried out, what I claim is:

1. In an apparatus for automatically opening and closing a gas conduit, a diaphragm casing, an inlet valve and an outlet valve alternatively operating under the control of the diaphragm, and opening against the direction of the flow of gas, flowing through the valves in their open position.

2. In an apparatus for automatically opening and closing a gas conduit, a diaphragm casing, an inlet and an outlet valve, alternatively operating under the control of the diaphragm, a rocking member, connected with the diaphragm and with the valves, and an inlet conduit, into which the said inlet valve opens, the outlet valve opening into the diaphragm casing.

3. In an apparatus for automatically opening and closing a gas conduit, a diaphragm casing, an inlet valve and an outlet valve, alternatively operating under the control of the diaphragm, a rocking member, connected with the diaphragm and carrying the valves on the one side of its rocking point, and carrying a balancing member on the other side of said rocking point.

4. In an apparatus for automatically opening and closing a gas conduit, a diaphragm casing, an inlet valve and an outlet valve, alternatively operating under the control of the diaphragm, a rocking member carrying the said valves, and a bar fixed to said rocking member laterally of and near to its point of rocking, and connected with the diaphragm.

In testimony whereof I have signed my name to this specification in the presence of two subscribing witnesses.

GUSTAF DALÉN.

Witnesses:
  JACOB BAGGE,
  WALDEMAR BOMAN.